United States Patent

Watanabe

[11] Patent Number: 5,164,443
[45] Date of Patent: Nov. 17, 1992

[54] ELECTROCONDUCTIVE SILICONE COMPOSITION

[75] Inventor: Satoshi Watanabe, Ohta, Japan

[73] Assignee: Toshiba Silicone Co., Ltd., Tokyo, Japan

[21] Appl. No.: 689,208

[22] Filed: Apr. 22, 1991

[30] Foreign Application Priority Data

Apr. 27, 1990 [JP] Japan .................. 2-113423
Apr. 27, 1990 [JP] Japan .................. 2-113425

[51] Int. Cl.$^5$ .............................. C08K 3/04; H01B 1/06
[52] U.S. Cl. .................................. 524/495; 524/436; 524/496; 252/511
[58] Field of Search .............. 252/571; 524/495, 496, 524/436

[56] References Cited

U.S. PATENT DOCUMENTS

| | | | |
|---|---|---|---|
| 4,250,075 | 2/1981 | Monroe et al. | 525/478 |
| 4,273,697 | 6/1981 | Sumimura et al. | 524/495 |
| 4,279,783 | 7/1981 | Kehrer et al. | 524/496 |
| 4,777,205 | 10/1988 | La Scola et al. | 252/511 |
| 4,898,689 | 2/1990 | Hamada et al. | 524/496 |
| 5,015,413 | 5/1991 | Nagaoka | 252/511 |

OTHER PUBLICATIONS

"Testing Methods of Carbon Black for Rubber Industry" Japanese Industrial Standard K-6221, 1982.

*Primary Examiner*—Paul R. Michl
*Assistant Examiner*—Tae H. Yoon
*Attorney, Agent, or Firm*—John L. Young

[57] ABSTRACT

Disclosed is an electroconductive silicone composition, which contains an acetylene black having an HCl-absorption of 12 ml/5 g or less and an I-adsorption of 50 mg/g or less and which has improved workability. The composition may further contain a magnesium carbonate, a silicone oil and/or a carbon black having a mean grain size of 200 m$\mu$ or more and a specific surface area of 15 m$^2$/g or less. The it composition has improved reproducibility and temperature-dependent stability with respect to the electroconductivity as well as improved fire-resistance.

Also disclosed is a silicone ink comprising (A) an addition-curable polyorganosiloxane, (B) a carbon black having an I-adsorption of 50 mg/g or less, a mean grain size of 35 m$\mu$ or more and a DBP adsorption of 150 ml/100 g or more, and (C) a solvent. The ink has improved storage stability.

13 Claims, No Drawings

ELECTROCONDUCTIVE SILICONE COMPOSITION

The present application claims the priorities of Japanese Patent Applications Serial No. 2-113423 and 2-113425 both filed on Apr. 27, 1990.

FIELD OF THE INVENTION

The present invention relates to an electroconductive silicone composition, which contains a particular carbon black and has excellent workability and electroconductivity.

BACKGROUND OF THE INVENTION

Hitherto, silicone compositions which cure to give silicone rubbers are well known, and such compositions are widely used as potting materials and coating materials for electric and electronic parts and as shaping materials for moulds because of their excellent properties, such as high weather-resistance, heat-resistance, cold-resistance and electric insulating property. Additionally, techniques for imparting electroconductive properties to a silicone composition which is naturally an insulating material are also known in the art.

Imparting electroconductivity properties to a silicone composition by incorporating an electroconductive carbon black into the silicone composition is generally known. For instance, JP-A-54-139659 (the term "JP-A" as used herein means an "unexamined published Japanese patent application") discloses an electroconductive organopolysiloxane elastomer containing a furnace black having a specific surface area of from 40 to 100 $m^2/g$ along with an acetylene black; JP-A-55-120656 discloses a liquid organopolysiloxane composition containing a carbon black which has a specific surface area of 900 $m^2/g$ or more and which is partly in the form of hollow shell grains; JP-A-55-108455 discloses an extrusion-shapable liquid organopolysiloxane composition containing both a carbon black and an electroconductive fiber; and JP-A-56-120761 discloses a silicone rubber composition containing a carbon black having a specific surface area of 80 $m^2/g$ or more.

The carbon black which is used for the purpose of imparting an electroconductivity to a resin composition as mentioned above may be classified into plural groups of a thermal black, a furnace black and an acetylene black. Above all as having a high purity, an acetylene black is used widely as a filler for imparting an electroconductivity to not only dry cells but also to other general rubbers.

In the case of a silicone rubber composition as mentioned above, however, if an excess amount of carbon black is incorporated into the composition for the purpose of imparting a high electroconductivity thereto, the excess carbon black would be incompatible with the base polymer. For instance, in the case of a millable silicone rubber composition, the plasticity of the non-vulcanized compound would thereby increase so that the fluidity of the compound during moulding would lower. As a result, severe problems would result in that the flowability into a mould, the extrudability from a mould and the roll-workability worsen extremely.

Additionally, another problem with excess carbon black-containing electroconductive silicone rubber compositions are that they do not have a highly stable and reproducible electroconductivity.

Further, another problem is that the electroconductivity of the composition often varies according to the ambient temperature so that the composition does not have a stable electroconductivity within a broad temperature range.

A silicone ink containing a curable polyorganosiloxane as a base polymer, which is diluted with a solvent, is used in various applications for coating or marking, because of the high oil-resistance and high weather-resistance of the cured silicone product. In particular, a carbon black-containing silicone ink having a high electroconductivity is used for forming contact parts of switches or for forming electric circuits.

However, a conventional carbon black-containing silicone ink which has heretofore been generally used has a drawback in that its dispersibility or solubility in solvents is extremely poor. Even after the ink has been dissolved in a solvent, it often separates easily from the solvent so that a uniform and stable ink solution is difficult to obtain.

SUMMARY OF THE INVENTION

The present invention overcomes the above-mentioned problems. The object of the present invention is to provide a acetylene black-containing electroconductive silicone rubber composition, which has improved plasticity and viscosity and which has an excellent workability in shaping the same.

Another object of the present invention is to provide an electroconductive silicone composition having a highly reproducible and stable electroconductivity.

Still another object of the present invention is to provide an electroconductive silicone composition having a stable electroconductivity which is not significantly influenced by the ambient temperature.

A further object of the present invention is to provide a silicone ink, which has excellent dispersibility and storage stability and which does not lose the excellent characteristics of high electroconductivity and/or colorability.

The present invention is based in part on the discovery that an excellent silicone composition which may contain a large amount of a carbon black and which has an excellent workability without loss of plasticity may be obtained by incorporating, as a carbon black, an acetylene black which is prepared by pyrolysis of a starting material of acetylene and which has a hydrochloric acid absorption of 12 ml/5 g or less and an iodine adsorption of 50 mg/g or less, into a silicone composition. One embodiment of the present invention is based on the foregoing discovery.

Additionally, it has been found that incorporation of the said carbon black along with magnesium carbonate into a silicone composition provides an excellent electroconductive silicone composition with high reproducibility and stability with respect to the electroconductivity. This finding is the basis for another embodiment of the present invention.

Further, it has been found that incorporation of a polyorganosiloxane having a viscosity at 25° C. of from 50 to 500,000 cps into an addition-curable electroconductive silicone composition containing the above-mentioned carbon black improves the temperature-dependence of the electroconductivity of the resulting composition, or that is, the electroconductivity of the composition is not significantly influenced by the ambient temperature and therefore a stable composition may be obtained at any desired temperature. On the basis of the finding, still another embodiment of the present invention has been achieved.

Still further, it has been found that incorporation of a carbon black having an iodine adsorption of 50 mg/g or less, a mean grain size of 35 mµ or more and a DBP (dibutyl phthalate) oil absorption of 150 ml/100 g or more into a silicone ink composition gives an excellent electroconductive silicone ink having a high storage stability. On the basis of the finding, a further embodiment of the present invention has been achieved.

DETAILED DESCRIPTION OF THE INVENTION

The particular acetylene black to be used in the present invention imparts an excellent electroconductivity to the composition of the invention and properly controls the plasticity or viscosity of the compound composition. Specifically, the acetylene black has a hydrochloric acid absorption of 12 ml/5 g or less and an iodine adsorption of 50 mg/g or less. The meanings of these quality characteristics are given below.

Specifically, it is known that a hydrochloric acid absorption as defined in JIS K 1469 (method of testing "acetylene black") is an index which indicates the degree of growth of the "chain structure of primary grains of carbon" and that an iodine adsorption as defined in JIS K 1474 "Method of Testing Powdery Active Charcoal" is an index which indicates the strength of the structure. Where electroconductivity is imparted to a rubber composition by incorporating a carbon black in to the composition, it is preferred that the carbon black to be incorporated thereto is one having a well grown structure or a high hydrochloric acid absorption amount and having a strong structure or a high iodine adsorption amount. This is because a carbon black having such a high hydrochloric acid absorption amount and a high iodine adsorption amount has an elevated secondary contact probability and therefore the structure of such a carbon black would hardly be broken by the stress imparted thereto by blending or kneading. For these reasons, the carbon black having the properties described above are used for the intended purpose of this invention. However, the statements above do not apply to silicone polymers which are much softer than any other organic polymers. Thus, the present invention has clarified that the carbon black to be incorporated into a silicone polymer composition needs a not high growing and not strong structure for attaining uniform dispersion in the composition.

Specifically, in order to impart good workability and good electroconductivity to a silicone polymer compound or composition, the acetylene black to be incorporated thereinto needs to have a hydrochloric acid absorption of 12 mg/g or less and an iodine adsorption of 50 mg/g or less. If either of these characteristics is more than this defined range, good workability and good electroconductivity will not be imparted to the compound or composition.

On the other hand, the polyorganosiloxane composition which is the main component of the silicone rubber composition of the present invention is prepared by blending and uniformly dispersing (a) a polyorganosiloxane base polymer, (b) a curing agent, and optionally various additives.

The particular silicone base polymer (a) and the curing agent (b) may properly be selected in accordance with the reaction mechanism used for obtaining the intended rubber-like elastic product. The reaction mechanism may be, for example, (1) a crosslinking reaction using an organic peroxide vulcanizing agent, (2) a condensation reaction method, and (3) an addition reaction method. It is well known that a preferred combination of the component (a) and the component (b) or a curing catalyst or a crosslinking agent is determined in accordance with the reaction mechanism used.

If the above-mentioned crosslinking method (1) is employed, in general, a polydiorganosiloxane having at least two vinyl groups as the organic groups bonded to the silicone atoms in one molecule is used as the base polymer of the component (a). As the curing agent, component (b), various organic peroxide vulcanizing agents can be used, which include, for example, benzoyl peroxide, 2,4-dichlorobenzoyl peroxide, dicumyl peroxide, cumyl-t-butyl peroxide, 2,5-dimethyl-2,5-di-t-butyl-peroxyhexane and di-t-butyl peroxide. In particular, preferred are dicumyl peroxide, cumyl-t-butyl peroxide, 2,5-dimethyl-2,5-di-t-butylperoxyhexane and di-t-butyl peroxide, as they give an especially lowered permanent compression strain to the cured product. One or more of such organic peroxide vulcanizing agents can be used in combination.

The proportion of the organic peroxide of a hardening agent of the component (b) is preferably from 0.05 to 15 parts by weight per 100 parts by weight of the silicone base polymer of component (a). If the proportion of the organic peroxide is less than 0.05 part by weight, cure of the composition would be insufficient. On the other hand, if the proportion of organic peroxide is more than 15 parts by weight, any more particular effects could not be attained and incorporation of such a large amount of curing agent would have adversely affect the properties of the final silicone rubber to be obtained.

Where the above-mentioned condensation reaction method (2) is employed, a polydiorganosiloxane having a hydroxyl group at both ends is used as the base polymer of component (a). The curing agent of component (b) to be used in the method (2) includes a crosslinking agent and a curing catalyst. As examples of usable crosslinking agents, there are mentioned alkoxy compounds such as ethyl silicate, propyl silicate, methyltrimethoxysilane, vinyltrimethoxysilane, methyltriethoxysilane, vinyltriethoxysilane, methyl-tris(methoxyethoxy)silane, vinyl-tris(methoxyethoxy)silane, methyltripropenoxysilane; acetoxy compounds such as methyltriacetoxysilane, vinyltriacetoxysilane; and methyltri(acetonoxime)silane, vinyltri(acetonoxime)silane, methyltri(methylethylketoxime)silane, vinyltri(methylethylketoxime)silane; as well as partial hydrolyzates of the said compounds. Additionally, there are further mentioned cyclic siloxanes such as hexamethy-bis(diethylaminoxy)cyclotetrasiloxane, tetramethyldi-butyl-bis(diethylaminoxy)cyclotetrasiloxane, pentamethyl-tris(diethylaminoxy)cyclotetrasiloxane, hexamethyl-bis(methylethylaminoxy) cyclotetrasiloxane, and pentamethyl-bis(diethylaminoxy)mono(methylethylaminoxy)cyclotetrasiloxane. The crosslinking agent may have either a silane structure or a siloxane structure, and the siloxane structure may be a linear, branched or cyclic one. Two or more of the crosslinking agents above may be used in combination.

As examples of curing catalysts usable in component (b), there are mentioned metal carboxylates such as iron octoate, cobalt octoate, manganese octoate, tin naphthenate, tin caprylate, tin oleate; as well as organic tin compounds such as dimethyl tin dioleate, dimethyl tin dilaurate, dibutyl tin diacetate, dibutyl tin dioctoate, dibutyl tin dilaurate, dibutyl tin dioleate, diphenyl tin diacetate, dibutyl tin oxide, dibutyl tin dimethoxide, dibutyl-bis(triethoxysiloxy) tin, and dioctyl tin dilaurate.

The amount of crosslinking agent is preferably from 0.1 to 20 parts by weight based on 100 parts by weight of the base polymer of component (a). If the amount of crosslinking agent is less than 0.1 part by weight, the cured rubber product will not have sufficient strength. On the contrary, if it is more than 20 parts by weight, the final rubber product will be inconveniently brittle. In either case, neither product could be put to practical use. On the other hand, the amount of curing catalyst in component (b) is preferably from 0.01 to 5 parts by weight based on 100 parts by weight of the base polymer of component (a). If it is present at less than the defined range, a longer time will be necessary for curing. Additionally, cure of the deep inside of the composition, which is not in contact with air, would be incomplete. On the contrary, if the amount of curing catalyst is more than the defined range, the storage stability of the composition would be lower. More preferably, the amount of curing catalyst is from 0.1 to 3 parts by weight based on 100 parts by weight of the base polymer of component (a).

Where the above-mentioned addition reaction method (3) is employed, the same base polymers as those used in the above-mentioned condensation method (1) may be used as component (a). Suitable curing catalysts in component (b) include platinum catalysts such as chloroplatinic acid, platinum-olefin complexes, platinum-vinylsiloxane complex, platinum black, and platinum- triphenylphosphine complex; suitable crosslinking agents of component (b) include polydiorganosiloxanes having an average of more than two silicon-bonded hydrogen atoms per molecule.

The amount of curing catalyst of component (b) in the composition is preferably from 1 to 1000 ppm as the amount of platinum element therein based on the base polymer of component (a). If the proportion of the hardening catalyst is less than 1 ppm as the amount of platinum element therein, cure the composition will not proceed sufficiently. On the contrary, if it is more than 1000 ppm, any particular elevation or acceleration of the hardening speed is not expected. The amount of crosslinking agent is preferably such that the number of silicon-bonded hydrogen atoms in the crosslinking agent may be from 0.5 to 4.0, more preferably from 1.0 to 3.0, per alkenyl group in component (a). If the number of hydrogen atoms in question is less than 0.5, cure of the composition could not proceed sufficiently and the hardness of the cured product would be low. On the contrary, if it is more than 4.0, the physical properties and the heat-resistance of the hardened product would be lower.

Organic groups in the polyorganosiloxanes which are used as the base polymer of the component (a) in the above-mentioned various reaction mechanisms, are monovalent substituted or unsubstituted hydrocarbon groups. These are, for example, unsubstituted hydrocarbon groups, such as an alkyl groups, e.g., methyl groups, ethyl groups, propyl groups, butyl groups, hexyl groups or dodecyl groups, aryl groups, e.g., phenyl groups, and aralkyl groups, e.g., β-phenylethyl groups or β-phenylpropyl groups; as well as substituted hydrocarbon groups, such as chloromethyl groups or 3,3,3-trifluoropropyl groups. In general, methyl groups are used in most cases because of the ease of production of the polymers.

In preparing the electroconductive silicone compositions of the present invention, any of the above-mentioned curing mechanisms and polysiloxane base polymers can be used. However, in view of the favorable electroconductive characteristics of the products to be obtained from the compositions, the addition reaction method (3) or the crosslinking reaction method by vulcanization with organic peroxides are preferred. Regarding the polysiloxane base polymers, so-called millable polysiloxane base polymers having a polymerization degree of 1000 or more are preferred. This is presumed because silicone compositions containing such polymers would have a high shear stress during blending so that the above-mentioned effects could be displayed more favorably.

The amount of acetylene black in the composition of the present invention will depend on the polymerization degree of the polysiloxane base polymer and the characteristics of the final silicone rubber composition and therefore it is not specifically defined herein. In general, it may be from 1 to 500 parts by weight, preferably from 5 to 200 parts by weight, based on 100 parts by weight of the polysiloxane base polymer (a) in the composition.

In order to improve the reproducibility and stability of the electroconductivity of the carbon black-containing electroconductive silicone composition of the present invention, incorporation of magnesium carbonate into the composition is effective.

"Magnesium carbonate" as referred to herein means a basic magnesium carbonate, which may roughly be represented by $4MgCO_3.Mg(OH)2.5H_2O$. It may be produced industrially.

The amount of magnesium carbonate to be incorporated in the composition is preferably from 10 to 300 parts by weight per 100 parts by weight of carbon black in the composition. If it is less than 10 parts by weight, any sufficient effect could not be obtained. However, if it is more than 300 parts by weight, any further elevated effect could not be expected.

Where the polyorganosiloxane composition in the carbon black-containing electroconductive silicone composition of the present invention is cured by addition reaction, it is preferred to incorporate a silicone oil having a viscosity at 25° C. of from 50 to 500,000 cps into the composition, whereby the electroconductivity of the cured product from the composition may be stabilized against the fluctuation of the ambient temperature.

The silicone oil to be used for the purpose above is preferably a linear one, which includes, for example, polydimethylsiloxanes having a vinyl group at both ends, polydimethylsiloxanes having a hydroxyl group at both ends, and polydimethylsiloxanes where both ends are blocked with a methyl group.

It is preferred that the polydimethylsiloxane having a vinyl group at both ends have a viscosity of from 3,000 to 500,000 cps, more preferably from 50,000 to 200,000 cps from the viewpoint of the effect thereof. If silicone oil is added to the composition, the polysiloxane base polymer of the main component in the composition should have a mean polymerization degree of 3000 or more, as the oil displays an especially excellent effect in that case.

The polydimethylsiloxane in which both ends have a hydroxyl group or a methyl group should have a viscosity of from 200 to 50,000 cps also from the viewpoint of the effect thereof.

The amount of silicone oil to be added is preferably from 1 to 20 parts by weight per 100 parts by weight of the polysiloxane base polymer in the composition. If it is less than 1 part by weight, any sufficient effect could not be obtained. However, if it is more than 20 parts by weight, the excess oil would often lower the electroconductivity of the cured product.

It is generally known that addition of a platinum compound to a silicone rubber is effective for making the rubber fire-proof. However, in the case of a carbon black-containing electroconductive silicone composition, if a platinum compound is added to the composition, the activity of the platinum compound added would lower because of the action of the existing carbon black so that the fire-proofing effect of the platinum compound is lowered. For that reason, it is necessary to add another mineral filler or fire-proofness enhancer, for example, $Ce(OH)_4$, $Fe_3O_4$ or the like, to the composition for the purpose of imparting a sufficient and high-level fire-proofness to the composition.

However, addition of such a filler or enhancer lowers the relative content of the electroconductive carbon black in the composition and thereby causes the electroconductivity of the resulting composition to be lower.

In that situation it is preferred to further add a carbon black having a mean grain size of 200 m$\mu$ or more and a specific surface area by BET method of 15 m$^2$/g or less, along with a platinum compound, to the composition for the purpose of imparting fire-proofness to the composition. By further addition of such a carbon black and a platinum compound to the composition, sufficient and high fire-proofness may be imparted to the composition without interfering with the electroconductivity thereof.

In such a case, the amount of carbon black to be further added to the composition is preferably from 1 to 50 parts by weight based on 100 parts by weight of the particular electroconductive carbon black as essentially incorporated into the composition.

Useful platinum compounds for imparting fire resistance to the composition of this invention include metal platinums such as platinum black, chloroplatinic acid, alcohol/chloroplatinic acid complexes, platinum/olefin complexes, platinum/ketone complexes, platinum/-vinylsiloxane complexes, and platinum/phosphorus complexes. Especially preferred are platinum/phosphorus complexes.

The amount of the platinum compound to be incorporated may be preferably from 1 to 1000 ppm as the amount of platinum atom in the compound, based on the polysiloxane base polymer in the composition.

The electroconductive silicone composition of the present invention may additionally contain, if desired, a filler, a pigment, a heat-resistance enhancer and a fire-proofing agent. Furthermore, it may also contain any other polyorganosiloxanes within such a range that would not interfere with the effect of the present invention. Examples of such optional additives include in general, a reinforcing filler such as fumed silica, precipitated silica or diatomaceous earth, as well as titanium oxide, aluminium oxide, zinc oxide, iron oxide, cerium oxide, mica, clay, graphite, zinc carbonate, manganese carbonate, cerium hydroxide, glass beads, polydimethylsiloxane, and alkenyl group-containing polysiloxanes.

In another embodiment, the present invention provides a silicone ink, which comprises, as active ingredients:

(A) an addition-curable polyorganosiloxane,
(B) a carbon black having an iodine adsorption of 50 mg/g or less, a primary grain size of 35 m$\mu$ or more and a DBP oil absorption of 150 ml/100 g or more, and
(C) a solvent.

As the addition-curable polyorganosiloxane (A), a mixture comprising the above-mentioned base polymer of component (a) and curing agent of the component (b), which is used in the above-mentioned addition reaction method (3), may be used.

As the carbon black of the component (B), the same electroconductive carbon black as that used in the electroconductive silicone rubber composition of the invention may be employed. However, the carbon black to be in the silicone ink of the embodiment must have the following characteristics:

(1) an iodine adsorption of 50 mg/g or less.
(2) a primary grain size of 35 m$\mu$ or more.
(3) a DBP oil absorption of 150 ml/100 g or more.

The meanings of the quality characteristics are given below.

The meaning of the iodine adsorption is as previously described herein. A primary grain size of various grains has become measured with accuracy in these days with elevation of the potency of recent electromicroscopes. Therefore, the value of the primary grain size is an important factor for defining the proportion of the carbon black (B) and for checking the behavior thereof. The meaning of DBP (dibutyl phthalate) absorption is defined in JIS K 6221 (method of testing carbon black for rubber), and the characteristic value of DBP absorption is an index of indicating the degree of the growth of the carbon structure.

Hitherto, a carbon black in the form of fine single grains having a primary grain size of about 15 m$\mu$ or less, in which the carbon structure is not almost grown, has been incorporated into a color ink containing a non-silicone base polymer. In addition, it has heretofore been considered, in planning an electroconductive ink composition, that a carbon black having a non-grown structure and having a small primary grain size is preferably used. However, where such a carbon black is incorporated into an almost non-crystalline silicone rubber having a low molecular weight, the plasticity increases rapidly and therefore compounding is to be difficult. Additionally, there are further problems on the dispersibility and solubility of the carbon black in solvent.

For these reasons, a carbon black having a primary grain size of 35 m$\mu$ or more is incorporated into the silicone ink of the present invention, whereby the above-mentioned drawbacks are avoided. However, if only the condition relating to the carbon black is satisfied, the electroconductivity and the coloring potency of the silicone ink would be lower although compounding of the constitutive components could be improved and the dispersibility of the carbon black into the composition could be elevated. In accordance with the present invention, it has been found that imparting a soft structure to the carbon black to be used in the silicone ink is effective in providing the desired characteristics of electroconductivity and coloring potency. On the basis of this finding, the silicone ink of the present invention has been attained. The condition is applied to the carbon black to be used with respect to the quality thereof. As a result, the carbon black is defined to have an iodine adsorption of 05 mg/g or less and a DBP absorption of 150 mg/100 g or more. Accordingly, the carbon black to be used in preparing the silicone ink of the present invention is one satisfying all the above-mentioned three conditions (1) to (3).

By incorporating the particularly defined carbon black having a primary grain size of 35 m$\mu$ or more, an iodine adsorption of 50 mg/g or less and a DBP absorption of 150 ml/100 g or more into the silicone ink of the present invention, compounding of the constitutive components and dispersibility of the carbon black into the ink composition have both been improved, and additionally, the resulting silicone ink has excellent electroconductive and coloring characteristics.

Carbon black is grouped into thermal black, furnace black and acetylene black, in accordance with the manufacturing method and the quality characteristics. It is preferred to use acetylene black when electroconductivity is desired, while furnace black is preferably used when coloring potency is desired.

The amount of carbon black of component (B) in the silicone composition will depend upon the polymerization degree of the polysiloxane base polymer in the composition and the characteristic of the resulting composition, and it is not specifically defined herein. In general, it may be from 5 to 500 parts by weight, preferably from 10 to 200 parts by weight, based on 100 parts by weight of the polysiloxane base polymer in the composition.

The solvent of component (C) in the composition is a solvent for the coating ink, and has the function of uniformly dissolving the mixture comprising component (A), component (B), and other optional additives. Examples of usable solvents include hydrocarbon solvents such as toluene, xylene, cyclohexane, n-hexane, n-heptane, n-octane, naphtha, mineral spirit, petroleum benzine; halogenated hydrocarbon solvents such as chloroform, carbon tetrachloride, trichloroethylene, perchloroethylene, 1,1,1-trichloroethane, perfluoropropane; ether solvents such as propyl ether, n-butyl ether, anisol, tetrahydrofuran, ethylene glycol diethyl ether; ester solvents such as ethyl acetate, butyl acetate, amyl acetate; ketone solvents such as acetone, methyl ethyl ketone, methyl isobutyl ketone, acetophenone; alcohol solvents such as methanol, ethanol, isopropanol, butanol, 2-methoxyethanol, 2-ethoxyethanol, 2-butyoxyethanol, ethylene glycol, propylene glycol; cyclic siloxane solvents such as hexamethyldisiloxane, tetramethyldiphenyldisiloxane, octamethyltrisiloxane, decamethyltetrasiloxane; and cyclic siloxane solvents such as hexamethylcyclotrisiloxane, octamethylcyclotetrasiloxane, heptamethylphenylcyclotetrasiloxane, heptamethylvinylcyclotetrasiloxane, and decamethylcyclopentasiloxane.

Though not specifically defined, the amount of component (C) is preferably from 10 to 2000 parts by weight, more preferably from 20 to 1500 parts by weight, based on 100 parts by weight of the above-mentioned component (A).

The silicone ink of the present invention can be prepared by uniformly dispersing and blending the above-mentioned components (A) to (C) by a conventional method. For instance, the base polymer (a) in the component (A) is fed into a universal kneader or the like, and the carbon black of component (B) is then portionwise added in several times with blending so that it is uniformly dispersed in the polymer (a). In the process, a part of component (a) is previously separated without being fed into the kneader and this is added after all of component (B) has been added to component (a) in the kneader, in order that the dispersibility of (B) in (a) is improved and the time-dependent stability of the resulting composition is improved. Additionally, the resulting blend of (a) and (B) may be passed through a three-roll mixer or is further kneaded under heat. The thus obtained uniform blend is then cooled to a temperature near room temperature, and thereafter the curing agent of the component (b) and the solvent of the component (C) are added thereto and uniformly dissolved and dispersed to finally obtain the intended silicone ink.

The silicone ink of the present invention may optionally contain, in addition to the above-mentioned essential components, any other conventional additives which are generally incorporated into silicone rubber compositions, such as a silica filler, a plasticizer, a heat-resistance promoter, a fire-proofing agent and a working aid, without interfering with the object of the present invention.

The present invention will be explained in more detail by way of the following examples, which, however, are not intended to restrict the scope of the present invention. Unless otherwise specifically indicated, all "parts" are by weight in the following description. The viscosity is measured at 25° C.

EXAMPLE 1 AND COMPARATIVE EXAMPLES 2 AND 3

To 100 parts of polydimethylsiloxane (I) (polymerization degree: about 6000) having a methylvinylsiloxane unit of 0.15 mol %, in which both ends were blocked with a trimethylsilyl group, was added acetylene black A having a hydrochloric acid absorption of 10 ml/5 g and an iodine adsorption of 48 mg/g, as a carbon black, in an amount of 60 parts as indicated in Table 1 below, in a kneader. Then the whole was fully blended and stirred and the resulting blend was taken out from the kneader.

Next, 2 parts of 2,5-dimethyl-2,5-di-t-butylperoxyhexane, as a crosslinking agent, was added thereto and uniformly blended to prepare a silicone rubber composition.

For comparison, comparative sample compositions (Comparative Example 2 and Comparative Example 3) were prepared in the same manner as above, except that a carbon black (acetylene black B) having a hydrochloric acid absorption of 16 ml/5 g and an iodine adsorption of 58 mg/g and a carbon black (furnace black C) having an iodine adsorption of 254 mg/g were used, respectively, in an amount as indicated in Table 1 below.

For each of the thus prepared silicone rubber compositions, the plasticity as well as the electroconductivity of the rubber product therefrom were evaluated by the methods described below.

Precisely, the elasticity of each sample composition was measured and evaluated with respect to the Williams plasticity, in accordance with JIS K 6300 (method of physical testing of non-vulcanized rubber).

Next, each compound was formed into a 2 mm-thick sheet and press-cured at 170° C. for 10 minutes. Then, this was post-cured as secondary vulcanization at 200° C. for 4 hours and thereafter returned back to room temperature to obtain a silicone rubber sheet. The volume resistivity of the sheet was measured by the use of a multi-meter (manufactured by Advantest Co.).

The results obtained are shown in Table 1 below.

As is obvious from the results in Table 1, the silicone rubber composition of the present invention containing the particular acetylene black is satisfactory for providing both high electroconductivity and good workability.

TABLE 1

|  | Example 1 | Comparative Examples 2 | Comparative Examples 3 | | Remarks | |
|---|---|---|---|---|---|---|
| Vinyl-containing Polysiloxane (I) | 100 | 100 | 100 | HCl-Absorption*1 | I-Adsorption | Manuaracture Method |
| Formulation (parts) | | | | | | |
| Carbon Black | | | | | | |
| A*2 | 60 | — | — | 10 ml/5g | 48 mg/g | Acetylene Pyrolysis |
| B*3 | — | 60 | — | 16 ml/5g | 58 mg/g | " |
| C*4 | — | — | 60 | — | 254 mg/g | Furnace Method |
| Crosslinking Agent | 2 | 2 | 2 | | | |
| Williams Plasticity (10-minute value) | 320 | 620 | 890 | | | |
| Volume Resistivity ($\Omega \cdot cm$) | 3.2 | 3.6 | 5.2 | | | |

Notes:
*1 As the definition of hydrochloric acid absorption is only to acetylene black. it does not apply to furnace black.
*2 "Denka Black HS-100" produced by Denki Kagaku Kogyo KK
*3 "Denka Black" produced by Denki Kagaku Kogyo KK
*4 "Ketjen Black EC" produced by Ketjen Black International Co.

EXAMPLES 2 AND 3 AND COMPARATIVE EXAMPLE 4

A composition within the scope of the present invention (Example 2) was prepared in the same manner as in Example 1, except that the amount of acetylene black A added was 10 parts and 15 parts of magnesium carbonate was further added.

In addition, another composition within the scope of the present invention (Example 3) was prepared also in the same manner as above, except that furnace black C was used in place of acetylene black A.

Next, a comparative composition (Comparative Example 4) was prepared in the same manner as in Example 2, except that silica powder was used in place of magnesium carbonate.

The electroconductivity of each of the cured products from these compositions was measured in the same manner as in Example 1. In order to check the dispersion of the measured values, measurement was effected ten times for each sample, and all the values obtained are shown in Table 2 below.

TABLE 2

|  | Examples 2 | Examples 3 | Comparative Examples 4 |
|---|---|---|---|
| Formulation (parts) | | | |
| Vinyl-containing Polysiloxane | 100 | 100 | 100 |
| Carbon Black | | | |
| A | 10 | — | 10 |
| C | 2 | 2 | 2 |
| Crosslinking agent | 2 | 2 | 2 |
| Magnesium Carbonate*5 | 15 | 15 | — |
| Silica Powder | — | — | 15 |
| Volume Resistivity ($\Omega \cdot cm$) | | | |
| 1 | $3.1 \times 10^4$ | $5.1 \times 10^6$ | $5.2 \times 10^4$ |
| 2 | $3.1 \times 10^4$ | $5.1 \times 10^6$ | $1.0 \times 10^3$ |
| 3 | $3.1 \times 10^4$ | $4.7 \times 10^6$ | $8.3 \times 10^5$ |
| 4 | $3.1 \times 10^4$ | $5.3 \times 10^6$ | $2.7 \times 10^3$ |
| 5 | $3.1 \times 10^4$ | $5.1 \times 10^6$ | $6.2 \times 10^4$ |
| 6 | $3.1 \times 10^4$ | $4.9 \times 10^6$ | $3.8 \times 10^5$ |
| 7 | $3.1 \times 10^4$ | $5.0 \times 10^6$ | $7.8 \times 10^4$ |
| 8 | $3.1 \times 10^4$ | $5.0 \times 10^6$ | $3.2 \times 10^3$ |
| 9 | $3.1 \times 10^4$ | $4.8 \times 10^6$ | $4.3 \times 10^4$ |
| 10 | $3.1 \times 10^4$ | $5.1 \times 10^6$ | $7.7 \times 10^5$ |

Notes:
*5 Basic magnesium carbonate
*6 Fumed silica. "Aerosil 200" produced by Nippon Aerosil Co.

EXAMPLE 4 AND COMPARATIVE EXAMPLES 5 AND 6

100 parts of polydimethylsiloxane (II) (polymerization degree: about 7000) having a methylvinylsiloxane unit of 0.40 mol %, in which both ends were blocked with a trimethylsilyl group, 60 parts of acetylene black A, and 10 parts by polydimethylsiloxane (silicone oil (I)) having a viscosity of 10,000 cSt (centistokes) and a vinyl group at both ends of the chain molecule were fed into a kneader and well blended and stirred, and the resulting blend was taken out therefrom.

Next, the compound thus formed was kneaded and formed into a sheet with roll, and the resulting sheet was cut into small pieces. These were dissolved in 300 parts of toluene to prepare a base sample composition (A-1).

Next, one part of methylhydrogen-polysiloxane having a viscosity of 20 cSt, in which both ends were blocked with a trimethylsilyl group, and chloroplatinic acid-isopropyl alcohol solution in an amount of 5 ppm, as the amount of platinum atom, were added to 100 parts of the previously prepared sample composition (A-1), and the whole was blended and uniformly dispersed to prepare a silicone composition (B-1).

For comparison, a comparative sample composition (A-2) was prepared in the same manner as in preparation of (A-1), except that the silicone oil (I) was not added; and a comparative silicone composition (B-2) was prepared in the same manner as in preparation of (B-1). Also for comparison, comparative compositions (A-3) and (B-3) were prepared in the same manner as above, except that acetylene black B was used in place of acetylene black A.

In order to determine the electroconductivity of each of the thus prepared silicone compositions, each silicone composition (B-1) to (B-3) was coated on a PET film in a dry thickness of about 50 μm. This was pre-dried in an oven having a temperature of 80° C. for 20 minutes, and then heated in an oven having a temperature of 200° C.

for one hour so that the coat was completely crosslinked. After allowed to stand as it was for a while, the volume resistivity of the hardened coat was measured at various temperatures.

The results obtained are shown in Table 3 below along with the formulations of the sample compositions tested.

TABLE 3

|  | Examples | Comparative Examples | |
|---|---|---|---|
|  | 4 | 2 | 3 |
| Formulation of Sample Composition A (parts) | | | |
| Vinyl-containing Polysiloxane (II) | 100 | 100 | 100 |
| Carbon Black | | | |
| A | 10 | 60 | — |
| B | — | — | 60 |
| Silicone Oil (I) | 10 | — | 10 |
| Toluene | 300 | 300 | 300 |
| (Sample) | (A-1) | (A-2) | (A-3) |
| Formulation of Silicone Composition B (parts) | | | |
| Sample Composition | 100 | 100 | 100 |
| Methyl-hydrogen Polysiloxane | 1 | 1 | 1 |
| Amount of Pt | 5 ppm | 5 ppm | 5 ppm |
| (Sample) | (B-1) | (B-2) | (B-3) |
| Volume Resistivity ($\Omega \cdot cm$) Temperature (°C.) | | | |
| −20 | 2.2 | 4.2 | 4.8 |
| 0 | 2.2 | 9.7 | 9.2 |
| 20 | 2.1 | 2.0 | 7.3 |
| 80 | 2.2 | 8.8 | $2.2 \times 10$ |
| 120 | 2.3 | $7.3 \times 10$ | $4.7 \times 10^2$ |
| 160 | 2.5 | $1.6 \times 10$ | $3.5 \times 10^4$ |

Notes:
*[5] Basic magnesium carbonate
*[6] Fumed silica. "Aerosil 200" produced by Nippon Aerosil Co.

EXAMPLES 5 AND 6 AND COMPARATIVE EXAMPLE 7

Samples as shown in Table 4 below were prepared in the same manner as in Example 4, except that polydimethylsiloxane (III) (polymerization degree: about 7000) having a methylvinyl siloxane unit of 0.50 mol %, in which the both ends were blocked with a trimethylsilyl group, was used as a polydimethylsiloxane, polydimethylsiloxane (silicone oil (II)) having a viscosity of 10,000 cSt and a hydroxyl group at both ends or polydimethylsiloxane (silicone oil (III) having a viscosity of 500 cSt, in which both ends were blocked with methyl groups, was used as a silicone oil, 400 parts of xylene was used in place of 300 parts of toluene and 30 parts of carbon black was used. The electroconductivity of each of the cured products from the compositions was determined in the same manner as in Example 4. The results obtained are shown in Table 4 below.

TABLE 4

|  | Examples | | Comparative Examples |
|---|---|---|---|
|  | 5 | 6 | 7 |
| Formulation of Sample Composition A (parts) | | | |
| Vinyl-containing Polysiloxane (II) | 100 | 100 | 100 |
| Carbon Black A | 30 | 30 | 30 |
| Silicone Oil | | | |
| (II) | 15 | — | — |
| (III) | — | 2 | — |
| Xylene | 400 | 400 | 400 |
| (Sample) | (A-4) | (A-5) | (A-6) |
| Formulation of Silicone Composition B (parts) | | | |
| Sample Composition | 100 | 100 | 100 |
| Methyl-hydrogen Polysiloxane | 1 | 1 | 1 |
| Amount of Pt | 5 ppm | 5 ppm | 5 ppm |
| (Sample) | (B-4) | (B-5) | (B-6) |
| Volume Resistivity ($\Omega \cdot cm$) Temperature (°C.) | | | |
| −20 | $3.6 \times 10^3$ | $7.7 \times 10^2$ | $2.2 \times 10^3$ |
| 0 | $3.7 \times 10^3$ | $6.4 \times 10^2$ | $7.0 \times 10^2$ |
| 20 | $3.7 \times 10^3$ | $6.9 \times 10^2$ | $9.3 \times 10^2$ |
| 80 | $3.5 \times 10^3$ | $7.2 \times 10^2$ | $8.2 \times 10^2$ |
| 120 | $3.5 \times 10^3$ | $6.4 \times 10^2$ | $3.5 \times 10^3$ |
| 160 | $3.7 \times 10^3$ | $9.8 \times 10^2$ | $4.9 \times 10^4$ |

EXAMPLE 7 AND 8 AND COMPARATIVE EXAMPLES 8, 9 AND 10

Compositions as shown in Table 5 below were prepared in the same manner as in Example 1, using polydimethylsiloxane (I), acetylene black A, chloroplatinic acid/phosphoric acid complex (Pt content: by weight), carbon black D having a mean grain size of 270 m$\mu$ and a specific surface area by BET method (Brunauer-Emett-Teller method based on N$_2$ adsorption) of 8.5 m$^2$/g, and 2,5-dimethyl-2,5-di-t-butylperoxyhexane as a crosslinking agent.

For comparison, comparative samples were prepared in the same manner as above, except that the amount of carbon black D was varied.

The electroconductivity of rubber products to be obtained from the respective compositions was measured in the same manner as in Example 1. In addition, the fire-proofness of these rubber products was determined in accordance with the test method of UL 94 (Underwriters Laboratories). The results obtained are shown in Table 5 below.

TABLE 5

|  | Examples | | Comparative Example | | |
|---|---|---|---|---|---|
|  | 7 | 8 | 8 | 9 | 10 |
| Formulation (parts) | | | | | |
| Vinyl-containing Polysiloxane (II) | 100 | 100 | 100 | 100 | 100 |
| Carbon Black | | | | | |
| A | 50 | 50 | 50 | 50 | 50 |
| D*[7] | 25 | 1 | 50 | 0.1 | — |
| Amount of Pt | 20 | 20 | 20 | 20 | 20 |
| Crosslinking Agent | 1.5 | 1.5 | 1.5 | 1.5 | 1.5 |
| Volume Resistivity ($\Omega \cdot cm$) | 10 | 10 | $3 \times 10^8$ | 10 | 10 |
| Fire-proofness (UL94) | | | | | |
| Max Flaming (sec.) | 1 | 0 | 0 | 15 | 25 |
| Total Flaming (sec.) | 0 | 0 | 0 | 120 | 130 |
| Total Glowing | 1 | 2 | 0 | 30 | 38 |

TABLE 5-continued

| | Examples | | Comparative Example | | |
|---|---|---|---|---|---|
| | 7 | 8 | 8 | 9 | 10 |
| (sec.) | | | | | |

Notes:
*7"Thermax Floform N-990" produced by Cancarb Limited.

EXAMPLE 9 AND COMPARATIVE EXAMPLES 11 AND 12

100 parts of polydimethylsiloxane (IV) (polymerization degree: about 6000) having a methylvinylsiloxane unit of 0.50 mol %, in which both ends were blocked with a trimethylsilyl group, and 50 parts of acetylene black E having a primary grain size of 53 m$\mu$, an iodine adsorption of 48 mg/g and a DBP absorption of 180 ml/100 g, as a carbon black, were fed into a kneader and fully kneaded and stirred, and thereafter the resulting blend was taken out from the kneader.

Next, the resulting compound was kneaded and formed into a sheet with rolls, and the sheet was then cut into small pieces. These were dissolved in 500 parts of toluene to prepare a base sample composition (A-7).

Afterwards, one part of methylhydrogen-polysiloxane having a viscosity of 20 cSt, in which both ends were blocked with trimethylsilyl group, and chloroplatinic acid-isopropyl alcohol solution in an amount of 5 ppm, as the amount of platinum atom, were added to 100 parts of the previously prepared sample composition (A-7), and the whole was blended and uniformly dispersed to prepare a silicone ink (B-7).

For comparison, a comparative sample composition (A-8) (Comparative Example 11) and a comparative sample composition (A-9) (Comparative Example 12) were prepared in the same manner as in Example 9, except that acetylene black F having a primary grain size of 40 m$\mu$, an iodine adsorption of 85 mg/g and a DBP absorption of 180 ml/100 g, and furnace black G having a primary grain size of 40 m$\mu$, an iodine adsorption of 63 mg/g and a DBP absorption of 168 ml/100 g were used, respectively, as indicated in Table 6 below; and a comparative silicone ink (B-8) (Comparative Example 11) and a comparative silicone ink (B-9) (Comparative Example 12) were prepared from the resulting compositions (A-8) and (A-9), respectively, also in the same manner as in Example 9.

The storage stability, dispersibility and solubility of each of the thus prepared samples were evaluated by the methods mentioned below.

Precisely, the storage stability and dispersibility of each of the sample compositions (A-7) to (A-9) were examined. First, each of these compositions was diluted with a solvent and then allowed to stand at room temperature. After 2 weeks, the upper half and the lower half were separated carefully from each other for each test sample. Then, the solvent was evaporated out from each part by heating at 150° C. with suction under reduced pressure. Each part was weighed with accuracy. By the weight ratio of the solid contents between the two parts for each sample, the storage stability and the dispersibility were evaluated.

Next, in order to examine the solubility of each of the silicone inks (B-7) to (B-9), each ink sample was applied to an injector whereupon the inner diameter of the needle with which all the introduced sample could be ejected out from the injector was measured. (This is to determine the minimum inner diameter of a needle which is not clogged with the insoluble components or the like in the ink sample tested.)

The results obtained are shown in Table 6 below, along with the formulations of the silicone ink sample compositions tested.

TABLE 6

| | Examples | Comparative Examples | |
|---|---|---|---|
| | 9 | 11 | 12 |
| Formulation of Sample Composition A (parts) | | | |
| Polyorganosiloxane (IV) | 100 | 100 | 100 |
| Acetylene Black E*8 | 30 | — | — |
| Acetylene Black F*9 | — | 30 | — |
| Furnace Black G*10 | — | — | 30 |
| Toluene | 500 | 500 | 500 |
| (Sample) | (A-7) | (A-2) | (A-3) |
| Formulation of Silicone Ink B (parts) | | | |
| Sample Composition A | 100 | 100 | 100 |
| Methyl-hydrogen Polysiloxane | 1 | 1 | 1 |
| Amount of Pt | 5 ppm | 5 ppm | 5 ppm |
| (Sample) | (B-7) | (B-8) | (B-9) |
| Solid Content in Sample Composition A (After Stored) | | | |
| Solid Content (%) in upper Half Part | 18 | 15 | 16 |
| Solid Content (%) in upper Half Part | 18 | 23 | 20 |
| Inner Diameter (mm) of Needle for Ejecting All Ink Sample | 0.13 | 0.95 | 0.41 |

Notes:
*8"Denka Black HS-100" produced by Denki Kagaku Kogyo KK (→acetylene black A)
*9"Denka Black" produced by Denki Kagaku Kogyo KK (→acetylene black B)
*10"Toka Black #4500" produced by Tokai Carbon Co., Ltd.

EXAMPLE 10 AND COMPARATIVE EXAMPLE 13

A sample composition (A-10) and a silicone ink composition (B-10) were prepared in the same manner as in Example 9, except that xylene was used in place of toluene (Example 10).

For comparison, a comparative sample composition (A-11) (Comparative Example 13) was prepared in the same manner as in Example 10, using acetylene black F; and a comparative silicone ink composition (B-11) (Comparative Example 13) was prepared also in the same manner as in Example 10, as indicated in Table 7 below.

The storage stability and the dispersibility of each of the thus prepared silicone ink samples were evaluated in the same manner as in the above-mentioned Example 9. Additionally, the electroconductivity of each sample was also evaluated in the same manner as in Example 4.

TABLE 7

| | Comparative Examples | |
|---|---|---|
| | 11 | 12 |
| Formulation of Sample Composition A (parts) | | |
| Polyorganosiloxane (IV) | 100 | 100 |
| Acetylene Black E | 50 | — |
| Acetylene Black F | — | 50 |

TABLE 7-continued

|  | Comparative Examples | |
|---|---|---|
|  | 11 | 12 |
| Xylene | 450 | 450 |
| (Sample) | (A-10) | (A-11) |
| Formulation of Silicone Ink B (parts) | | |
| Sample Composition A | 100 | 100 |
| Methyl-hydrogen Polysiloxane | 1 | 1 |
| Amount of Pt | 5 ppm | 5 ppm |
| (Sample) | (B-10) | (B-11) |
| Solid Content in Sample Composition A (After Stored) | | |
| Solid Content (%) in upper Half Part | 16 | 14 |
| Solid Content (%) in upper Half Part | 16 | 22 |
| Volume Resistivity of 50 υm-thick Coat (Ω · cm) | 1.2 | 7.8 |

While the invention has been described in detail and with reference to specific embodiments thereof, it will be apparent to one skilled in the art that various changes and modifications can be made therein without departing from the spirit and scope thereof.

What is claimed is:

1. An electroconductive silicone rubber composition containing a carbon black, a polysiloxane base polymer and a curing agent wherein the improvement comprises that the carbon black is (i) an acetylene black (ii) having a hydrochloric acid absorption of 12 ml/5 g or less and (iii) an iodine adsorption of 50 mg/g or less whereby the electroconductivity is reproducible and stable from −20° C. to 160° C.

2. The composition of claim 1, in which the curing agent of the silicone rubber composition is an organic peroxide and the composition is curable under heat.

3. The composition of claim 1, in which the silicone rubber composition is curable by addition reaction.

4. The composition of claim 2, in which the polysiloxane base polymer of the silicone rubber composition has a polymerization degree of 1000 or more.

5. The composition of claim 3, in which the polysiloxane base polymer of the silicone rubber composition has a polymerization degree of 1000 or more.

6. The composition of claim 1 further comprising basic from 10 to 300 parts by weight of magnesium carbonate per 100 parts by weight of carbon black.

7. The composition of claim 3 further comprising from 1 to 20 parts by weight of a silicone oil having a viscosity at 25° C. of from 50 to 500,000 cps per 100 parts by weight of the polysiloxane base polymer.

8. The composition of claim 7, in which the silicone oil has a vinyl group at both ends.

9. The composition of claim 7, in which the silicone oil is a polydimethylsiloxane in which both ends are blocked with a hydroxyl or methyl group.

10. The composition of claim 1 further comprising a carbon black having a mean grain size of 200 mμ or more and a specific surface area of 15 m$^2$/g or less.

11. The composition of claim 10 further comprising a platinum compound.

12. An electroconductive silicone ink comprising:
(A) an addition-curable polyorganosiloxane,
(B) a carbon black and (C) a solvent wherein the improvement comprises that the carbon black has (i) iodine absorption of 50 mg/g or less, (ii) a mean grain size of 35 mμ or more and (iii) a dibutyl phthalate absorption of 150 ml/1000 g or more whereby the ink is readily dispersible in a solvent.

13. The ink of claim 12, in which the carbon black is an acetylene black.

* * * * *